(12) United States Patent
Stefanescu et al.

(10) Patent No.: US 8,980,377 B1
(45) Date of Patent: Mar. 17, 2015

(54) CLAY-BASED CONCRETE SEALER

(76) Inventors: Eduard A. Stefanescu, Butte, MT (US);
Sunil V. Kulkarni, Butte, MT (US)

( * ) Notice: Subject to any disclaimer, the term of this patent is extended or adjusted under 35 U.S.C. 154(b) by 80 days.

(21) Appl. No.: 13/506,461

(22) Filed: Apr. 20, 2012

Related U.S. Application Data

(60) Provisional application No. 61/517,586, filed on Apr. 22, 2011.

(51) Int. Cl.
*B05D 3/02* (2006.01)
*C08L 33/02* (2006.01)
*C09K 3/00* (2006.01)

(52) U.S. Cl.
USPC ............. 427/393; 427/421; 524/445; 524/69; 524/71; 524/262; 252/389.32; 252/389.3

(58) Field of Classification Search
CPC ............. B05D 3/02; C08L 33/02; C09K 3/00
USPC ............. 524/445, 69, 71, 262; 427/393, 421; 252/389.32, 389.3
See application file for complete search history.

(56) References Cited

U.S. PATENT DOCUMENTS

| | | |
|---|---|---|
| 3,772,065 A | 11/1973 | Seiler |
| 3,819,400 A | 6/1974 | Plankl et al. |
| 3,879,206 A | 4/1975 | Nestler et al. |
| 3,980,597 A | 9/1976 | Shinadeh |
| 4,536,534 A | 8/1985 | Singer et al. |
| 4,814,407 A | 3/1989 | Canova et al. |
| 4,816,506 A | 3/1989 | Gamon et al. |
| 4,894,405 A | 1/1990 | Barron |
| 4,897,291 A | 1/1990 | Kim |

FOREIGN PATENT DOCUMENTS

| | | | |
|---|---|---|---|
| JP | 2000119635 A | * | 4/2000 |
| RU | 2453573 C1 | * | 6/2012 |

* cited by examiner

*Primary Examiner* — Michael M Bernshteyn
(74) *Attorney, Agent, or Firm* — Robert M Hunter

(57) ABSTRACT

A transparent, non-yellowing, polymer-clay, concrete sealer and methods for making and applying the same. The disclosed clay-based sealer provides a tough, ultraviolet-light-, temperature-, and abrasion-resistant layer that effectively protects surfaces from moisture penetration, staining, dirt, dust, and wear. The substrates to which the clay-based sealer may be applied include, but are not limited to, above and below grade concrete structures, brick, concrete masonry unit (CMU) block, grout, plaster, gunite, tile, and aggregate. The clay-based sealer may easily be applied with airless or air-assisted sprayers, or by roller, brush, or applicator pad. Once applied, the sealer requires minimal maintenance.

29 Claims, 3 Drawing Sheets

CLAY-BASED CONCRETE SEALER

CROSS-REFERENCES TO RELATED APPLICATIONS

This application claims the benefit of U.S. Provisional Patent Application No. 61/517,586, filed Apr. 22, 2011, the disclosure of which patent application is incorporated by reference as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W911QX-08-C-0049 awarded by the U.S. Department of Defense, United States Army.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to sealing systems for porous materials, such as masonry and concrete. In particular, the invention relates to a transparent, non-yellowing, polymer-clay, concrete sealer and methods for making and applying the same.

Many concrete, aggregate, clay and plaster surfaces typically require sealing to protect against moisture absorption that can negatively affect the mechanical behavior of structures and triggers the growth of undesired molds. Reinforced concrete/aggregate structures typically include steel bars alone or in combination with reinforcing bars to create reinforcing effects against longitudinal-tension, compression, as well as diagonal tension. Because of the chemical nature of these reinforcing bars (ferrous-based materials), they are subjected to intense corrosion when exposed to chloride-containing salts, or oxides of sulfur or nitrogen, which leads to quick deterioration and loss of reinforcing effect. Such components are easily carried by water through the pores of concrete and aggregate structures. The exterior surfaces of concrete and aggregate structures act as a host location and invasion point for the water-dissolved corrosive salts. When formulations of the sealer disclosed herein are utilized in sealing the concrete or aggregate structures, significant protection of the reinforcement is obtained due to complete pore sealing which prevents water absorption and desorption.

The background art describes several waterborne and solvent-borne sealer compositions for concrete applications, including silanes, silicones, silicates, siloxanes, siliconates, acrylics, vinyls, polyurethanes, styrene-butadiene copolymers, etc. Primarily because the high volatile organic carbon (VOC) content associated with many known solvents increase health risks and fire hazards, as well as environmental risks, it is highly desirable to use efficient waterborne waterproofing compositions. The waterborne seal coat formulations described in this disclosure have sealing properties matched to the task, and are tough and durable, and are therefore able to provide long term protection for concrete, aggregate, clay and plaster structures. When dried and cured, these coatings provide a desirable balance of properties with respect to porosity, water absorption and water resistance. While most background art coating formulations compounded for the coating of concrete exhibit a certain amount of porosity, it has been found that the formulations disclosed herein remain pore-free even at temperatures in excess of 100° C. In this way, the formulations disclosed herein prevent unwanted excessive concrete dehydration which leads to crack formation and loss of mechanical properties. One or more additional coatings of the formulations disclosed herein may be applied to the surface in order to assist in forming an appropriate seal.

Polymeric materials in the form of solutions, suspensions, emulsions and dispersions can be reinforced with inorganic clay fillers, in order to improve the mechanical properties and gas/water barrier characteristics of the resultant dry materials. Clays, also known as phyllosilicates, are a class of reinforcing materials having dimensions on the order of one billionth of a meter, or one nanometer. Composites incorporating such nanoscopic fillers are called nanocomposites. In recent decades, polymer-clay nanocomposite materials have received tremendous attention because they provide enhanced mechanical and thermal properties when compared to conventional unfilled materials. More precisely, when compared to neat polymers, clay-based polymer nanocomposites exhibit increased tensile strength, modulus, and heat distortion resistance, as well as lower water sensitivity, reduced permeability to gases, and similar thermal coefficients of expansion. It has been also reported that clays impart a level of flame retardance and ultraviolet (UV) light resistance not present in the neat polymer matrix.

Montmorillonite is the most widely employed clay for the fabrication of polymer-clay nanocomposites. Montmorillonite, which belongs to the Smectites family, is a 2:1 charged phyllosilicate that contains exchangeable interlayer cations. The 2:1 structure indicates that one octahedral layer of atoms, typically consisting of aluminum, oxygen and hydrogen, is sandwiched between two tetrahedral layers of silicon oxides. The montmorillonite platelets, normally ranging from 60 nanometers (nm) to several hundred nm across and 1 nm in thickness, produce a slightly opaque system when dispersed in polymer solutions, emulsions or suspensions. In solution, the polymer and clay platelets produce a network-like structure, which is interpenetrated by a sub-network of interconnecting pores containing excess polymer and solvent.

The spaces between the clay platelets are known as the gallery spacing. Under proper mixing conditions, the gallery spacing can be swollen and filled with monomer, oligomer, or polymer, depending on the application. The swelling of the gallery spacing results in an increased distance between the clay platelets in the stacks. Clay platelets swollen with polymer are known as intercalated. If the clay swells so much that it is no longer organized into stacks, and the platelets lose the parallelism with respect to one another, the clay is said to be exfoliated. The extent of exfoliation may be determined through x-ray diffraction (XRD) measurements. The absence of diffraction peaks at a characteristic diffraction angle, typically in the range of small 2θ angles (2 to 5), indicates complete exfoliation.

On the other hand, a large diffraction peak indicates poor exfoliation, and it may be representative of intercalation or aggregation, depending on the position of the peak and the clay type. The diffraction angle is inversely correlated with the interlayer or gallery spacing through Bragg's law. Consequently, the extent of exfoliation is measured by analyzing the level of diffraction intensity at the expected diffraction angle (based on the interlayer spacing). Thus, the interlayer or gallery spacing is a function of the particular clay. Complete exfoliation, wherein all stacks are delaminated into single platelets surrounded by polymer, may be desired, although not always required, to achieve optimal nanocomposite properties. Nevertheless, predominant exfoliation is generally required to accomplish the desired enhanced properties in the resulting product. Complete clay exfoliation in the polymer-based dry sealer is defined herein as a complete absence of a diffraction peak in an XRD measurement.

The background art is characterized by U.S. Pat. Nos. 3,772,065; 3,819,400; 3,879,206; 3,980,597; 4,536,534; 4,814,407; 4,816,506; 4,894,405; and 4,897,291; the disclosures of which patents are incorporated by reference as if fully set forth herein.

BRIEF SUMMARY OF THE INVENTION

As used herein, the following terms and variations thereof have the meanings given below, unless a different meaning is clearly intended by the context in which such term is used.

"A," "an" and "the" and similar referents used herein are to be construed to cover both the singular and the plural unless their usage in context indicates otherwise.

"Comprise" and variations of the term, such as "comprising" and "comprises," as well as "having" and "including" are not intended to exclude other additives, components, integers or steps.

"Exemplary," "illustrative," and "preferred" mean "another."

"Sealer", as used herein, means a system, formulation, or composition applied as a coat to a substrate in order to prevent subsequent coats and small molecule compounds (e.g., moisture and water dissolved salts, like sodium chloride, NaCl) from infiltrating into the pores of the substrate.

"Emulsion", as used herein, means a mixture of polymer droplets suspended in a continuous phase, in which the polymer is insoluble, by means of a surfactant or emulsifier. The continuous phase may refer to water, or to an organic solvent.

"Polymer", as used herein, means a large molecule built from the same repeating monomeric units and typically has a molecular weight in a range from about 10,000 grams per mole (g/mol) to about 6,000,000 g/mol.

"Copolymer", as used herein, means a large molecule built from two or more different repeating units, such as bipolymers (i.e., comprising two different monomeric units), terpolymers (i.e., comprising three different monomeric units), tetrapolymers (i.e., comprising four different monomeric units) and so on. In addition, the repeating monomeric units can alternate in a sequential pattern (e.g., A-B-A-B), block pattern (e.g., A-A-B-B), random pattern (A-B-B-A-B-A) or combinations thereof.

"Monomeric unit" or "monomer" means a low molecular weight organic molecule that can interact and be joined with a number of the same or different molecules to form a large molecule having repeating monomeric units, wherein the repeating monomeric units have a similar chemical architecture and atom composition as the isolated monomeric units.

"Clay", as used herein, means any inorganic material, or organically-modified inorganic material, or mixtures thereof, such as a smectite clay mineral, which is in the form of a plurality of adjacent, bound layers. The layered clay is made of adjacent platelet particles characterized by a certain inter-platelet spacing.

"Exfoliate" and "exfoliated clay" mean clay platelets that are dispersed predominantly in an individual state throughout the carrier material, such as the polymer matrix. In this disclosure "exfoliated" is used to designate the highest degree of separation of clay platelets.

"Exfoliation" means the process of forming exfoliated clay from a less dispersed state of platelet separation, such as intercalated or aggregated clay.

"Predominantly" means the vast majority; a system with predominantly exfoliated clay is a system wherein only a few clay platelets are not exfoliated and generate a very small diffraction shoulder on an X-ray diffraction (XRD) measurement curve.

The sealer formulations (systems or compositions) described in this disclosure have been found to be highly appropriate and perform exceptionally well when employed on concrete/aggregate structures with the purpose of sealing the surfaces from external moisture. In addition, the disclosed sealer system is capable of preventing loss of moisture from concrete structures. In short, the disclosed sealer system reduces to a minimum the rate of water absorption/desorption, thus preventing water related damage. When concrete/aggregate surfaces are coated with the disclosed clay-based waterproofing sealer compositions, they are also imparted overall protection from corrosion and general deterioration. The sealer formulations are effective because of enhanced compatibility of the components leading to equally enhanced performance.

An object of illustrative embodiments of the invention is to provide a sealer composition that is easily applied to a substrate under conditions where sealing cannot be effectively performed with background art sealer compositions or employing background art application methods, and a method for applying the same. In illustrative embodiments, the sealer disclosed herein provides complete protection against substrate dehydration and/or water and moisture absorption even at elevated temperatures, up to 130° C. Illustrative embodiments of the sealer composition can be easily applied with airless or air-assisted sprayers, by roller, brush, or applicator pad, and are primarily intended, without limitation, for above and below grade concrete structures, indoor and outdoor aggregate surfaces, clay-brick, ceramic and plaster walls, masonry basements, floors etc. The above-mentioned objects of these embodiments can be accomplished using a sealer material based on a solvent-borne or waterborne polymer solution, suspension, emulsion, or dispersion and comprising completely or predominantly exfoliated clays.

In an illustrative embodiment, the invention is a sealer system for sealing exposed concrete, brick, concrete masonry unit block, grout, plaster, gunite, tile, and aggregate, said sealer system comprising: 90 percent by weight to 99.5 percent by weight of a solvent-borne or waterborne polymeric emulsion, a solvent-borne or waterborne polymeric dispersion, a solvent-borne or waterborne polymeric suspension, or solvent-borne polymeric solution; and 0.5 percent by weight to 10 percent by weight of a completely or predominantly exfoliated clay. In another embodiment, the sealer system further comprises: a pigment, a surfactant, a surface tension modifier, a pH adjuster, a coalescing agent, an ionic strength agent, a foam suppressant, a flow additive, a film forming additive, a temperature resistant additive, an ultraviolet light absorber, an antibacterial agent, a gloss agent, or a hardener. In another embodiment, the sealer system is comprised of said solvent-borne or waterborne polymeric emulsion. In another embodiment, said waterborne polymeric emulsion comprises a polymer of acrylate monomers. In another embodiment, said completely or predominantly exfoliated clay is a hydrophobic montmorillonite. In another embodiment, the sealer system further comprises: a basic pH modifier selected from a group consisting of ammonia, sodium carbonate, and sodium bicarbonate. In another embodiment, the sealer system further comprises: a coalescing agent. In another embodiment, said coalescing agent is di(propylene glycol)butyl ether.

In another illustrative embodiment, the invention is a sealer system comprising: (1) a first component selected from the group consisting of: an emulsion, a dispersion, or a suspension comprising: a waterborne polyurethane, a waterborne alkyd, a waterborne polyester, a waterborne epoxy, a waterborne acrylic, or a combination thereof, or a waterborne polyolefin, a waterborne polypropylene, or a combination thereof, or a waterborne emulsion, a waterborne dispersion, or a waterborne suspension comprising a copolymer, or a solvent borne polymeric solution, a solvent borne polymeric emulsion, a solvent borne polymeric dispersion, or a solvent borne polymeric suspension; and (2) a second component comprising: a swelling clay selected from the group consisting of: a montmorillonite, a saponite, a nontronite, a laponite, a beidellite, a iron-saponite, a hectorite, a sauconite, a stevensite, a vermiculite, and a combination thereof, or a non-swelling clay selected from the group consisting of a kaolin mineral, a serpentine mineral, a mica mineral, a chlorite mineral, a sepiolite, a palygorskite, a bauxite, a silica, and a combination thereof; wherein the percent solids by weight of said waterborne emulsion, said waterborne dispersion, or said waterborne suspension is between 20 percent and 75 percent of the weight of the sealer system when it is in an undried state; and wherein said solvent borne polymeric solution, said solvent borne polymeric emulsion, said solvent borne polymeric dispersion, or said solvent borne polymeric suspension is between 90 percent solids by weight to 99.5 percent solids by weight of the sealer system when it is in a dried state. In another embodiment, said waterborne polyolefin is a waterborne polyethylene.

In yet another illustrative embodiment, the invention is a sealer system comprising: (1) an emulsion comprising: (a) a waterborne polyurethane, a waterborne alkyd, a waterborne polyester, a waterborne epoxy, a waterborne acrylic, or a combination thereof, or (b) a waterborne polyolefin, a waterborne polypropylene, or a combination thereof, or (c) a polymeric waterborne emulsion comprising a copolymer, a polymeric waterborne dispersion comprising a copolymer, or a polymeric waterborne suspension comprising a copolymer; and (2) a clay that has been rendered hydrophobic through a reaction with an organic-compound; wherein said waterborne polymeric emulsion, said waterborne polymeric dispersion, or said waterborn polymeric suspension has a percent solids of about 99 percent by weight to 95 of the weight of the dried system; and wherein said hydrophobic clay is selected from the group consisting of: an organically-modified montmorillonite, an organically-modified saponite, an organically-modified nontronite, an organically-modified laponite, an organically-modified beidellite, an organically-modified iron-saponite, an organically-modified hectorite, an organically-modified sauconite, an organically-modified stevensite, an organically-modified vermiculite, and a combination thereof; and wherein said organically-modified clay comprises from 1 percent by weight to 5 percent by weight of the weight of the solids in said polymeric waterborne emulsion. In another embodiment, said organic compound comprises a monosubstituted atom, a disubstituted atom, a trisubstituted atom, or a tetrasubstituted atom. In another embodiment, said organic compound comprises an alkyl group or a alkenyl group having 1 to 12 carbon atoms. In another embodiment, said alkyl group is selected from the series consisting of: a methy group, an ethyl group, a propyl group, a t-butyl group, a hexyl group, a heptyl group, a octyl group, a decyl group, and a dodecyl group. In another embodiment, said alkyl group is halogen substituted and selected from the series consisting of: a chloromethyl group, a 3,3,3-trifluoropropyl group, and a 6-chlorohexyl group. In another embodiment, said alkenyl group is selected from the series containing: a vinyl group, an allyl group, and a hexenyl group. In another embodiment said organic compound comprises a heteroatom or a aryl radical.

In a further illustrative embodiment, the invention is a sealer system comprising: a waterborne acrylic emulsion that has a solids content between 35 percent by weight and 45 percent by weight of the weight of the waterborne acrylic emulsion and that comprises 95 percent by weight to 98 percent by weight of the weight of the sealer system; and a hydrophobic, organically-modified montmorillonite that comprises between 2 percent by weight and 5 percent by weight of the weight of the solids in the waterborne acrylic emulsion.

In another illustrative embodiment, the invention is a sealer system comprising: an emulsion comprising a waterborne polyurethane, a waterborne alkyd, a waterborne polyester, a waterborne epoxy, a waterborne acrylic, or a combination thereof; or a waterborne polyolefin, a waterborne polypropylene, or a combination thereof; or a waterborne emulsion, a waterborne dispersion, or a waterborne suspension comprising a copolymer, wherein said waterborne emulsion, waterborne dispersion, or waterborne suspension accounts for 99 percent by weight to 95 percent by weight of the weight of the sealer system when it is dried; and a clay; wherein the percent solids of the sealer system is in the range 30 percent by weight to 60 percent by weight of the weight of the sealer system when it is undried. In another embodiment, said clay has been rendered hydrophobic through a reaction with an organic compound. In another embodiment, said clay is selected from the group consisting of: an organically-modified montmorillonite, an organically-modified saponite, an organically-modified nontronite, an organically-modified laponite, an organically-modified beidellite, an organically-modified iron-saponite, an organically-modified hectorite, an organically-modified sauconite, an organically-modified stevensite, an organically-modified vermiculite, and a combination thereof. In another embodiment, said clay is incorporated in the sealer system in amounts ranging from 1 percent by weight to 5 percent by weight of the weight of the solids in said aqueous emulsion.

In yet another illustrative embodiment, the invention is a sealer system made by combining: a waterborne acrylic emulsion with a solids content between 35 percent by weight and 45 percent by weight of the weight of the waterborne acrylic emulsion, wherein the emulsion accounts for 95 percent by weight to 98 percent by weight of the weight of the formulation; and a hydrophobic clay that is an organically modified montmorillonite, and that is employed in amounts between 2 percent by weight and 5 percent by weight of the weight of the solids in the waterborne acrylic emulsion. In another embodiment, the sealer system further comprises: a pigment, a surfactant, a surface tension modifier, a pH adjuster, a coalescing agent, an ionic strength agent, a foam suppressant, a flow additive, a film forming additive, a temperature resistant additive, an ultraviolet light absorber, an antibacterial agent, a gloss agent, or a hardener. In another embodiment, the viscosity of the sealer system is in the range between $5\times10^2$ cP and $5\times10^4$ cP in its undried state.

In another illustrative embodiment, the invention is also a method of increasing the water repellency of a masonry or concrete structure comprising: coating or impregnating the masonry or concrete structure with one or more of the sealer systems disclosed herein. In a preferred embodiment, the sealer system provides complete protection against structure dehydration and water and moisture absorption at temperatures up to about 130° C. In another embodiment, said coating or impregnating is accomplished by means of an airless or air-assisted sprayer, a roller, a brush, or an applicator pad.

Further aspects of the invention will become apparent from consideration of the drawings and the ensuing description of exemplary embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate exemplary embodiments of the invention. A person skilled in the art will understand that other embodiments of the invention are possible and that the details of the invention may be modified in a number of respects, all without departing from the concept. Thus, the following drawings and description are to be regarded as illustrative in nature and not restrictive. In the drawings.

DETAILED DESCRIPTION OF THE INVENTION

Figure 1:
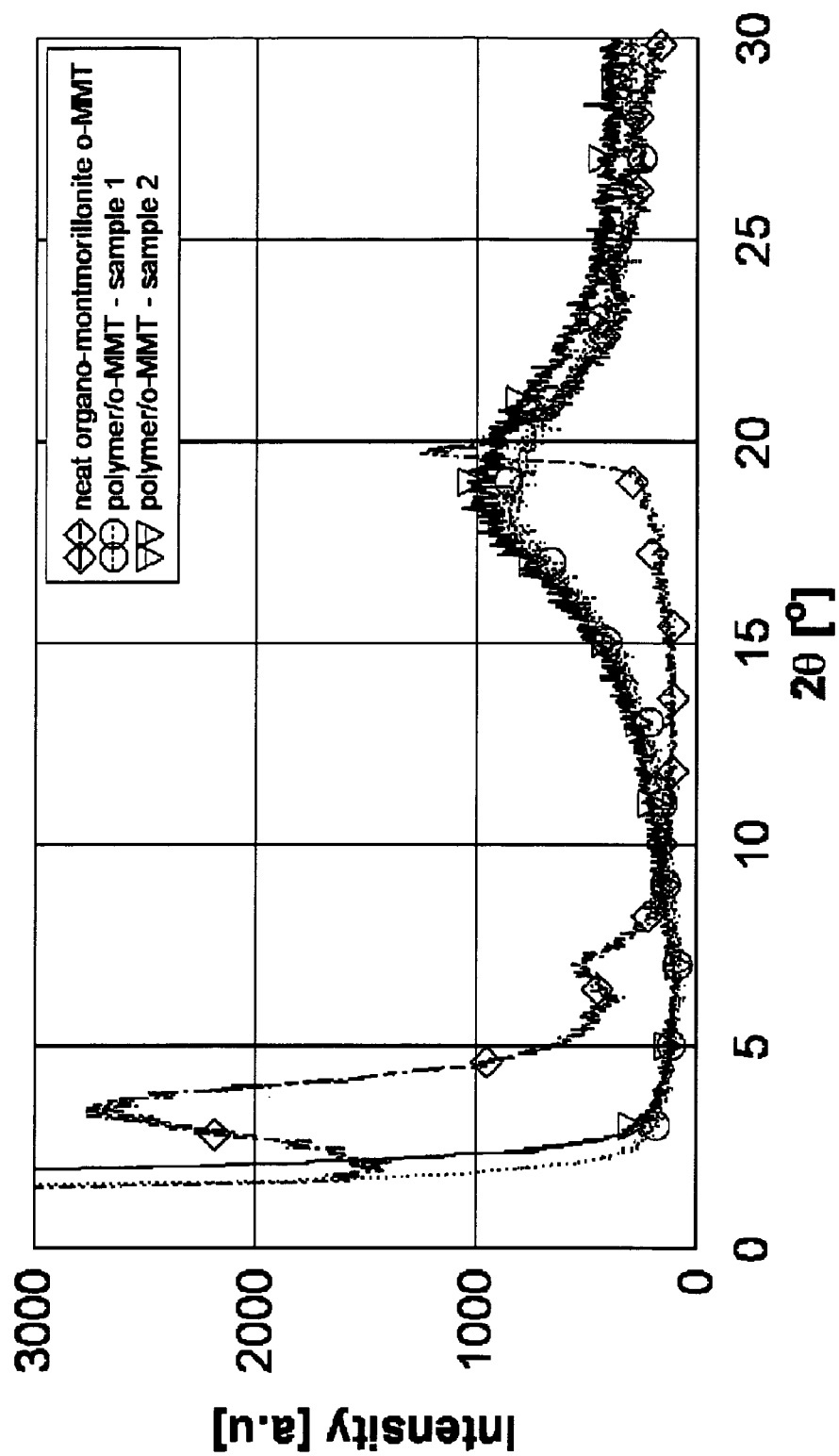
FIG. 1 is a graph showing XRD traces of complete clay exfoliation in two distinct samples comprising an acrylic polymer and 2 percent by weight of Cloisite 20A clay. For comparison, an XRD curve from the neat Cloisite 20A clay is also presented.

In an illustrated embodiment, the invention is a formulation or system comprising: an emulsion, a dispersion, or a suspension comprising, but not limited to, a waterborne polyurethane, a waterborne alkyd, a waterborne polyester, a waterborne epoxy, a waterborne acrylic, or a combination thereof. In another illustrative embodiment, the invention is a formulation or system comprising a waterborne polyolefin, such as waterborne polyethylene, a waterborne polypropylene, or a combination thereof. In another illustrative embodiment, the invention is a formulation or system comprising a waterborne emulsion, a waterborne dispersion, or a waterborne suspension comprising a copolymer containing monomeric units of the chemical natures disclosed previously in this paragraph. The percent solids by weight of these waterborne emulsions, waterborne dispersions, and waterborne suspensions is preferably between 20 percent and 75 percent of the weight of the undried system.

Alternatively, in another illustrative embodiment, the invention is a formulation or system comprising: a solvent borne solution, a solvent borne emulsion, a solvent borne dispersion, or a solvent borne suspension. In this embodiment, the polymeric solution, the polymeric emulsion, the polymeric dispersion, or the polymeric suspension accounts for 90 percent solids by weight to 99.5 percent solids by weight of the final (dried) system.

Depending on the polarity of the selected polymeric system, the clay may be either hydrophilic or may be organically modified (as described below), and the clay be swelling or non-swelling. Suitable swelling clays include, without limitation, montmorillonite, saponite, nontronite, laponite, beidellite, iron-saponite, hectorite, sauconite, stevensite, vermiculite, and a combination thereof. Suitable non-swelling clays include, without limitation, kaolin minerals (including kaolinite, dickite and nacrite), serpentine minerals, mica minerals (including illite), chlorite minerals, sepiolite, palygorskite, bauxite, silica, and a combination thereof.

A person skilled in the art will understand that a primarily hydrophobic or water-immiscible solution, or an emulsion, a dispersion or a suspension wherein the emulsified, dispersed or suspended component is primarily hydrophobic or water-immiscible, requires the clay in a clay-based sealer to be hydrophobically modified or functionalized in order to favor interactions of the clay with the solution or with the emulsified, dispersed, or suspended component. Similarly, a hydrophilic or water-miscible solution, or an emulsion, dispersion or suspension wherein the emulsified, dispersed, or suspended component is primarily hydrophilic or water-miscible, requires the clay in a clay-based sealer to be in its natural hydrophilic form. A person skilled in the art will also understand that the clay may be hydrophobically modified by means of a variety of chemistries and that the modifier is preferably a compound containing a monosubstituted, disubstituted, trisubstituted, or tetrasubstituted atom directly linked with the clay and comprising alkyl or alkenyl groups of 1 to 12 carbons or more, and the compound may optionally include heteroatoms, such as halogens, and aryl radicals, such as phenyl, naphthyl, and tolyl. For example, the alkyl group may be selected from the series including, but not limited to methyl, ethyl, propyl, t-butyl, hexyl, heptyl, octyl, decyl, and dodecyl; an alkenyl group may be selected, without limitation, from the group comprising vinyl, allyl, and hexenyl. If the alkyl radical is halogen substituted, it may be selected from a group comprising, without limitation, chloromethyl, 3,3,3-trifluoropropyl, and 6-chlorohexyl. The clay is preferably incorporated in amounts ranging between 0.5 percent and 10 percent by weight of the weight of the solids in the aqueous emulsion, dispersion, or suspension.

In a more preferred embodiment, the invention is a formulation comprising: an emulsion comprising: a waterborne polyurethane, a waterborne alkyd, a waterborne polyester, a waterborne epoxy, a waterborne acrylic, or a combination thereof. Alternatively, the formulation comprises: a waterborne polyolefin, such as waterborne polyethylene, a waterborne polypropylene, or a combination thereof. Alternatively, the formulation comprises: a waterborne emulsion, a waterborne dispersion, or a waterborne suspension comprising a copolymer containing monomeric units of the chemical natures disclosed previously in this paragraph, wherein the percent solids is in the range 30 percent by weight to 60 percent by weight of the weight of the undried system. The waterborne polymeric, emulsion, dispersion, or suspension preferably accounts for 99 percent by weight to 95 percent by weight of the weight of the final (dried) system.

In this more preferred embodiment, the clay is rendered hydrophobic through a reaction with an organic-compound. The hydrophobic clay may be chosen, without limitation, from a series of organically-modified montmorillonite, saponite, nontronite, laponite, beidellite, iron-saponite, hectorite, sauconite, stevensite, vermiculite, and a combination thereof. In this more preferred embodiment, the clay is preferably incorporated in amounts ranging from 1 percent by weight to 5 percent by weight of the weight of the solids in the aqueous emulsion.

In the most preferred embodiment, the invention is a formulation comprising: a waterborne acrylic emulsion with a solids content between 35 percent by weight and 45 percent by weight of the weight of the waterborne acrylic emulsion, wherein the emulsion accounts for 95 percent by weight to 98 percent by weight of the weight of the formulation. Most preferably, the hydrophobic clay is an organically modified montmorillonite, and that is employed in amounts between 2 percent by weight and 5 percent by weight of the weight of the solids in the waterborne acrylic emulsion.

The clay may be incorporated and exfoliated in solvent-borne solutions or solvent-borne and waterborne emulsions, solvent-borne and waterborne dispersions, and solvent-borne and waterborne suspensions through mixing methods known in the art, including without limitation, blenders, overhead mixers, high speed homogenizers, ultrasound baths, ultrasound probes, sonolators, acoustic mixers, etc. Depending on the nature of the substrate, application method, and nature of the continuous phase, the sealer composition may optionally include, without limitation, pigments, surfactants, surface tension modifiers, pH adjusters, coalescing agents, ionic strength agents, foam suppressants, flow additives, film forming additives, temperature resistant additives, UV absorbers, antibacterial agents, gloss agents, hardeners, etc.

Substrate treatment prior to application of the sealer may include without limitation dust vacuuming, detergent washing, pressure washing, acid etching, grit blasting, etc. The sealer composition may be easily applied with airless or air-assisted sprayers, by roller, brush, or applicator pad. For best results, the viscosity of the clay-based sealer is preferably in the range between $5 \times 10^2$ centipoise (cP) and $5 \times 10^4$ cP.

WORKING EXAMPLES

A number of samples of the sealers disclosed herein were synthesized and tested by the applicants.

Example I

A clay-based concrete sealer composition was prepared in accordance with the formulation presented below. Component percentages by weight of the (undried) formulation are given.

RayCryl® 1001 acrylic (Specialty Polymers Inc. of Woodburn, Oreg.) . . . 92.2%
Cloisite® 20A nanoclay (Southern Clay Products of Austin, Tex.) . . . 0.92%
Di(propylene glycol)butyl ether (Aldrich of St. Louis, Mo.) . . . 3.59%
Surfynol® 104PG defoamer (Air Products of Allentown, Pa.) . . . 0.67%
Aqueous $NH_3$ (11.8M—Hill Brothers Chem. of Orange, Calif.) . . . 0.2.62%

This formulation was utilized as a concrete sealer and provided an effective barrier against water absorption from the outside environment and against water desorption from the concrete. The formulation of Example I was designed to incorporate about 2 percent by weight of clay (Cloisite® 20A) relative to the weight of the solids in the waterborne acrylic emulsion (RayCryl® 1001), which was 45 to 47 percent by weight emulsion.

Figure 2:
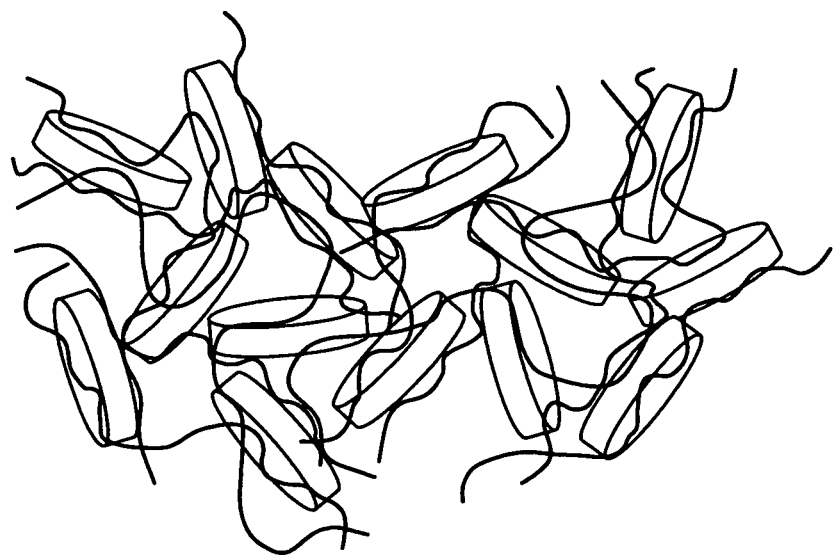
FIG. 2 is a schematic diagram showing polymer chains causing clay platelets to completely exfoliate.

The procedure for exfoliation of the clay in the acrylic waterborne emulsion was as follows: 920 grams (g) of RayCryl® 1001 was added to a tall mixing container equipped with an overhead mixer. While mixing the emulsion gently [e.g., at 100 revolutions per minute (rpm) to 200 rpm], 35.6 g of di(propylene glycol)butyl ether, 6.7 g of Surfynol® 104PG, and 26.2 g of aqueous $NH_3$ were added. After adding all components, the viscosity increased tremendously in less than 1 minute. Next, 9.2 g of Cloisite® 20A was added, and the speed of the overhead mixer was increased to 1,200 rpm. The formulation was mixed overnight at room temperature. Following mixing, the formulation was diluted with 184 g of water (e.g., 20 parts by volume of water per 100 parts of RayCryl® 1001 emulsion). The formulation contained completely exfoliated clay, as confirmed by the complete absence of a diffraction peak in the XRD plot in FIG. 1 for the polymer-clay samples, and schematically depicted in FIG. 2.

In laboratory testing, when a molten polymer top layer was sprayed on the surface of a concrete wall coated with the sealer of Example I employing a polymer thermal sprayer at a molten polymer temperature in the range 90° C. to 140° C., no pinholes were observed in the top layer, indicating that no water was leaving the concrete wall. For comparison, when a molten polymer top layer was sprayed on the surface of a non-sealed concrete wall employing the same polymer thermal sprayer at a temperature in the range 90° C. to 140° C., extensive pinholing of the top layer occurred because of water leaving the concrete wall at an accelerated rate.

Example II

A clay-based concrete sealer composition was prepared in accordance with the formulation presented below. Component percentages by weight of the (undried) formulation are given.

RayCryl® 1001 acrylic (Specialty Polymers Inc. of Woodburn, Oreg.) . . . 0.94%
Cloisite® 30B nanoclay (Southern Clay Products of Austin, Tex.) . . . 0.92%
Di(propylene glycol)butyl ether (Aldrich of St. Louis, Mo.) . . . 4.08%
Surfynol® 104PG defoamer (Air Products of Allentown, Pa.) . . . 0.28%
Aqueous $NH_3$ (11.8M—Hill Brothers Chem. of Orange, Calif.) . . . 0.72%

This formulation was utilized as a concrete sealer and provided an effective barrier against water absorption from the outside environment and against water desorption from the concrete. By way of further explanation, the formulation of Example II was designed to incorporate around 2 percent by weight clay (Cloisite® 30B) relative to the weight of the solids in the acrylic emulsion (RayCryl® 1001), which was 45 to 47 percent by weight of the emulsion.

Figure 4:
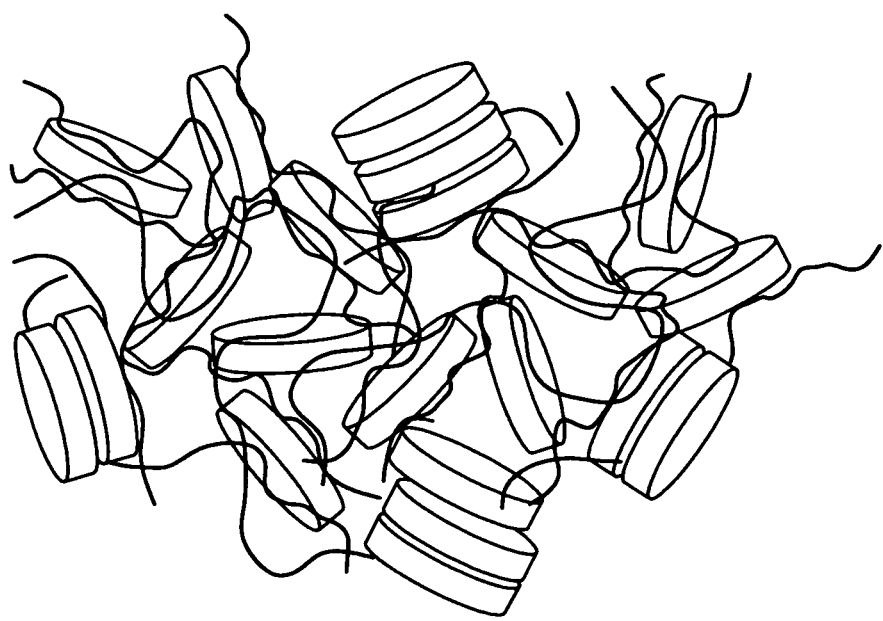
FIG. 4 is a schematic diagram showing polymer chains causing clay platelets to predominantly exfoliate.
Figure 3:
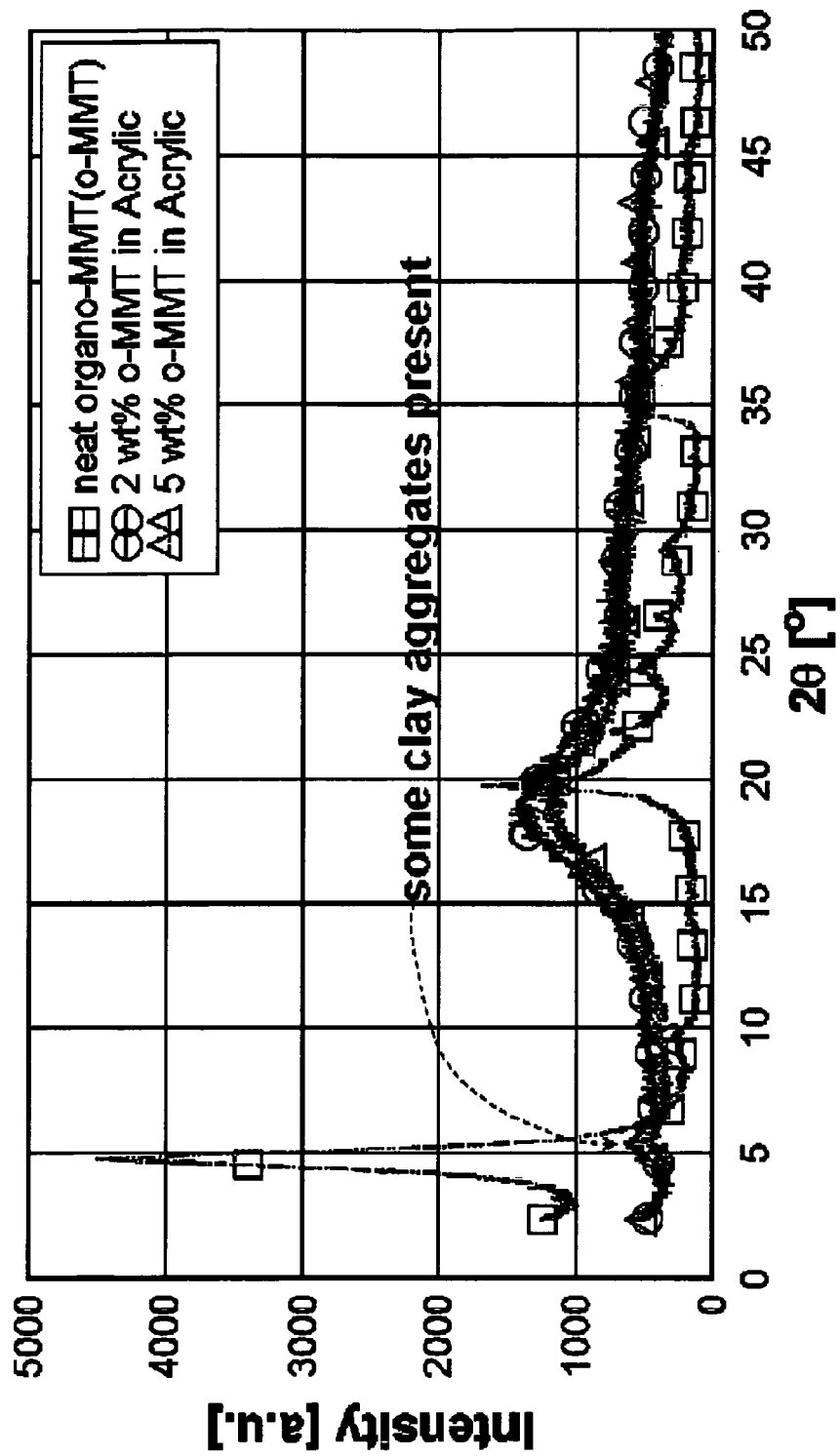
FIG. 3 is a graph showing XRD traces of predominant clay exfoliation in two distinct samples based on acrylic polymer and comprising 2 wt % and 5 wt % Cloisite 30B clay. For comparison, an XRD curve from the neat Cloisite 30B clay is also presented.

The procedure for exfoliation of the clay in the acrylic waterborne emulsion was as follows: 940 g RayCryl® 1001 was added to a tall mixing container equipped with an overhead mixer. While mixing the emulsion gently (e.g., at 100 to 200 rpm), 40.8 g of di(propylene glycol)butyl ether, 2.8 g of Surfynol® 104PG, and 7.2 g of aqueous $NH_3$ were added. After adding all components, the viscosity increased significantly in less than 1 minute. Next, 9.2 g of Cloisite® 30B was added, and the speed of the overhead mixer was elevated to 1,200 rpm. The formulation was mixed overnight at room temperature. Following mixing, the formulation was diluted with 188 g of water (e.g., 20 parts by volume water per 100 parts RayCryl® 1001 emulsion). The formulation contained predominantly exfoliated clay, as indicated by the small diffraction shoulder observed in the XRD plot in FIG. 3 for the polymer-clay samples, and schematically depicted in FIG. 4.

In laboratory testing, the sealer of Example II was applied to the surface of concrete specimens containing capacitive moisture sensors. When the sealed surface of the specimens was placed in a water filled container, no humidity change was recorded in the specimens after 15 hours of immersion. For comparison, an uncoated concrete specimen equipped with a capacitive moisture sensor showed a 10 percent relative humidity increase after only 90 minutes, when subjected to the same test.

In addition, when a molten polymer top layer was sprayed on the surface of a concrete wall coated with the sealer of Example II employing a polymer thermal sprayer at a temperature in the range 90° C. to 140° C., no pinholes were observed in the top layer, indicating that no water was leaving the concrete wall. For comparison, when a molten polymer top layer was sprayed on the surface of a non-sealed concrete wall employing the same polymer thermal sprayer at a molten polymer temperature in the range 90° C. to 140° C., extensive pinholing of the top layer occurred because of water leaving the concrete wall at an accelerated rate.

Example III

A clay-based concrete sealer composition was prepared in accordance with the formulation presented below. Component percentages by weight of the (undried) formulation are given.

RayCryl® 1001 acrylic (Specialty Polymers Inc. of Woodburn, Oreg.) . . . 92.88%
Cloisite® 30B nanoclay (Southern Clay Products of Austin, Tex.) . . . 2.33%
Di(propylene glycol)butyl ether (Aldrich of St. Louis, Mo.) . . . 4.02%
Surfynol® 104PG defoamer (Air Products of Allentown, Pa.) . . . 0.62%
Aqueous $NH_3$ (11.8M—Hill Brothers Chem. of Orange, Calif.) . . . 0.27%

This formulation was utilized as a concrete sealer and provided an effective barrier against water absorption from the outside environment and against water desorption from the concrete. By way of further explanation, the formulation of Example III was designed to incorporate about 5 percent by weight of clay (Cloisite® 30B) relative to the weight of the solids in the acrylic emulsion (RayCryl® 1001) which was 45 to 47 percent by weight of the emulsion.

The procedure for exfoliation of the clay in the acrylic waterborne emulsion was as follows: 928.8 g of RayCryl® 1001 was added to a tall mixing container equipped with an overhead mixer. While mixing the emulsion gently (e.g., at 100 to 200 rpm), 40.2 g of di(propylene glycol)butyl ether, 6.2 g of Surfynol® 104PG, and 2.7 g of aqueous $NH_3$ were added. After adding all components; the viscosity increased significantly in less than 1 minute. Next, 23.3 g of Cloisite® 30B was added, and the speed of the overhead mixer was increased to 1,200 rpm. The formulation was mixed overnight at room temperature. Following mixing, the formulation was diluted with 188 g of water (e.g., 20 parts by volume of water per 100 parts RayCryl® 1001 emulsion). The formulation contained predominantly exfoliated clay, as indicated by the small diffraction shoulder observed in the XRD plot in FIG. 3 for the polymer-clay samples, and schematically depicted in FIG. 4.

In laboratory testing, when a molten polymer top layer was sprayed on the surface of a concrete wall coated with the sealer of Example III employing a polymer thermal sprayer at a temperature range 90° C.-140° C., no pinholes were observed in the top layer, indicating that no water was leaving the concrete wall. For comparison, when a molten polymer top layer was sprayed on the surface of a non-sealed concrete wall employing the same polymer thermal sprayer at a molten polymer temperature in the range 90° C. to 140° C., extensive pinholing of the top layer occurred because of water leaving the concrete wall at an accelerated rate.

Many variations of the invention will occur to those skilled in the art. Some variations include water-based systems. Other variations call for solvent-based systems. All such variations are intended to be within the scope and spirit of the invention.

Although some embodiments are shown to include certain features or steps, the applicants specifically contemplate that any feature or step disclosed herein may be used together or in combination with any other feature or step on any embodiment of the invention. It is also contemplated that any feature or step may be specifically excluded from any embodiment of the invention.

What is claimed is:

1. A sealer system for sealing exposed concrete, brick, concrete masonry unit block, grout, plaster, gunite, tile, and aggregate, said sealer system comprising:
    90 percent by weight to 99.5 percent by weight of a solvent-borne or waterborne polymeric emulsion, a solvent-borne or waterborne polymeric dispersion, a solvent-borne or waterborne polymeric suspension, or solvent-borne polymeric solution; and
    0.5 percent by weight to 10 percent by weight of a completely or predominantly exfoliated clay.

2. The sealer system of claim 1, further comprising:
    a pigment, a surfactant, a surface tension modifier, a pH adjuster, a coalescing agent, an ionic strength agent, a foam suppressant, a flow additive, a film forming additive, a temperature resistant additive, an ultraviolet light absorber, an antibacterial agent, a gloss agent, or a hardener.

3. The sealer system of claim 1, wherein the sealer system is comprised of said solvent-borne or waterborne polymeric emulsion.

4. The sealer system of claim 3, wherein the sealer system is comprised of said waterborne polymeric emulsion.

5. The sealer system of claim 4, wherein said waterborne polymeric emulsion comprises a polymer of acrylate monomers.

6. The sealer system of claim 5, wherein said completely or predominantly exfoliated clay is a montmorillonite.

7. The sealer system of claim 6 further comprising:
    a basic pH modifier selected from a group consisting of ammonia, sodium carbonate, and sodium bicarbonate.

8. The sealer system of claim 7 further comprising:
    a coalescing agent.

9. The sealer system of claim 8 wherein said coalescing agent is di(propylene glycol)butyl ether.

10. A sealer system for sealing exposed concrete, brick, concrete masonry unit block, grout, plaster, gunite, tile, and aggregate, said sealer system comprising:
    a first component selected from the group consisting of:
        an emulsion, a dispersion, or a suspension comprising:
            a waterborne polyurethane, a waterborne alkyd, a waterborne polyester, a waterborne epoxy, a waterborne acrylic, or a combination thereof, or a waterborne polyolefin, a waterborne polypropylene, or a combination thereof, or a waterborne emulsion, a waterborne dispersion, or a waterborne suspension comprising a copolymer, or a solvent borne polymeric solution, a solvent borne polymeric emulsion, a solvent borne polymeric dispersion, or a solvent borne polymeric suspension; and a second component comprising:

a completely or predominantly exfoliated clay, wherein said completely or predominantly exfoliated clay is selected from the group consisting of: a montmorillonite, a saponite, a nontronite, a laponite, a beidellite, a iron-saponite, a hectorite, a sauconite, a stevensite, a vermiculite, a kaolin mineral, a serpentine mineral, a mica mineral, a chlorite mineral, a sepiolite, a palygorskite, a bauxite, a silica, and a combination thereof;

wherein the percent solids by weight of said waterborne emulsion, said waterborne dispersion, or said waterborne suspension is between 20 percent and 75 percent of the weight of the sealer system when it is in an undried state; and wherein said solvent borne polymeric solution, said solvent borne polymeric emulsion, said solvent borne polymeric dispersion, or said solvent borne polymeric suspension is between 90 percent solids by weight to 99.5 percent solids by weight of the sealer system when it is in a dried state.

11. The sealer system of claim 10 wherein said waterborne polyolefin is a waterborne polyethylene.

12. A sealer system for sealing exposed concrete, brick, concrete masonry unit block, grout, plaster, gunite, tile, and aggregate, said sealer system comprising:

a waterborne acrylic emulsion that has a solids content between 35 percent by weight and 45 percent by weight of the weight of the waterborne acrylic emulsion and that comprises 95 percent by weight to 98 percent by weight of the weight of the sealer system; and a completely or predominantly exfoliated clay that comprises between 2 percent by weight and 5 percent by weight of the weight of the solids in the waterborne acrylic emulsion.

13. A method of increasing the water repellency of a masonry or concrete structure comprising:

coating or impregnating the masonry or concrete structure with the sealer system of claim 1.

14. A method of increasing the water repellency of a masonry or concrete structure comprising:

coating or impregnating the masonry or concrete structure with the sealer system of claim 10.

15. A method of increasing the water repellency of a masonry or concrete structure comprising:

coating or impregnating the masonry or concrete structure with the sealer system of claim 12;

thereby providing complete protection against structure dehydration and water and moisture absorption at temperatures up to about 130° C.

16. The method of claim 13 wherein coating or impregnating is accomplished by means of an airless or air-assisted sprayer, a roller, a brush, or an applicator pad.

17. A sealer system for sealing exposed concrete, brick, concrete masonry unit block, grout, plaster, gunite, tile, and aggregate, said sealer system comprising:

an emulsion comprising a waterborne polyurethane, a waterborne alkyd, a waterborne polyester, a waterborne epoxy, a waterborne acrylic, or a combination thereof; or a waterborne polyolefin, a waterborne polypropylene, or a combination thereof; or a waterborne emulsion, a waterborne dispersion, or a waterborne suspension comprising a copolymer, wherein said waterborne emulsion, waterborne dispersion, or waterborne suspension accounts for 99 percent by weight to 95 percent by weight of the weight of the sealer system when it is dried; and a completely or predominantly exfoliated clay;

wherein the percent solids of the sealer system is in the range 30 percent by weight to 60 percent by weight of the weight of the sealer system when it is undried.

18. The sealer system of claim 17 wherein said completely or predominantly exfoliated clay is incorporated in the sealer system in amounts ranging from 1 percent by weight to 5 percent by weight of the weight of the solids in said aqueous emulsion.

19. A method of increasing the water repellency of a masonry or concrete structure comprising:

coating or impregnating the masonry or concrete structure with the sealer system of claim 17.

20. A sealer system for sealing exposed concrete, brick, concrete masonry unit block, grout, plaster, gunite, tile, and aggregate, said sealer system made by combining:

a waterborne acrylic emulsion with a solids content between 35 percent by weight and 45 percent by weight of the weight of the waterborne acrylic emulsion, wherein the emulsion accounts for 95 percent by weight to 98 percent by weight of the weight of the formulation; and a completely or predominantly exfoliated clay that is employed in amounts between 2 percent by weight and 5 percent by weight of the weight of the solids in the waterborne acrylic emulsion.

21. The sealer system of claim 20 further comprising: a pigment, a surfactant, a surface tension modifier, a pH adjuster, a coalescing agent, an ionic strength agent, a foam suppressant, a flow additive, a film forming additive, a temperature resistant additive, an ultraviolet light absorber, an antibacterial agent, a gloss agent, or a hardener.

22. A method of increasing the water repellency of a masonry or concrete structure comprising:

coating or impregnating the masonry or concrete structure with the sealer system of claim 20.

23. The sealer system of claim 20 wherein the viscosity of the sealer system is in the range between $5 \times 10^2$ cP and $5 \times 10^4$ cP in its undried state.

24. A method of increasing the water repellency of a masonry or concrete structure comprising:

coating or impregnating the masonry or concrete structure with the sealer system of claim 23.

25. A sealer system for sealing exposed concrete, brick, concrete masonry unit block, grout, plaster, gunite, tile, or aggregate, said sealer system comprising:

90 percent by weight to 99.5 percent by weight of a solventborne or waterborne polymeric emulsion, a solventborne or waterborne polymeric dispersion, a solventborne or waterborne polymeric suspension, or solventborne polymeric solution; and 0.5 percent by weight to 10 percent by weight of a completely or predominantly exfoliated clay;

wherein said sealer system is operative to prevent release of water from the exposed concrete, brick, concrete masonry unit block, grout, plaster, gunite, tile, or aggregate when said sealer system is in the temperature range of 90 degrees Centigrade to 140 degrees Centigrade.

26. A sealer system for sealing exposed concrete, brick, concrete masonry unit block, grout, plaster, gunite, tile, or aggregate, said sealer system comprising:
  a first component selected from the group consisting of:
    an emulsion, a dispersion, or a suspension comprising:
      a waterborne polyurethane, a waterborne alkyd, a waterborne polyester, a waterborne epoxy, a waterborne acrylic, or a combination thereof, or
      a waterborne polyolefin, a waterborne polypropylene, or a combination thereof, or
      a waterborne emulsion, a waterborne dispersion, or a waterborne suspension comprising a copolymer, or
      a solvent borne polymeric solution, a solvent borne polymeric emulsion, a solvent borne polymeric dispersion, or a solvent borne polymeric suspension; and
  a second component comprising:
    a completely or predominantly exfoliated clay, wherein said completely or predominantly exfoliated clay is selected from the group consisting of: a montmorillonite, a saponite, a nontronite, a laponite, a beidellite, a iron-saponite, a hectorite, a sauconite, a stevensite, a vermiculite, a kaolin mineral, a serpentine mineral, a mica mineral, a chlorite mineral, a sepiolite, a palygorskite, a bauxite, a silica, and a combination thereof;
  wherein the percent solids by weight of said waterborne emulsion, said waterborne dispersion, or said waterborne suspension is between 20 percent and 75 percent of the weight of the sealer system when it is in an undried state;
  wherein said solvent borne polymeric solution, said solvent borne polymeric emulsion, said solvent borne polymeric dispersion, or said solvent borne polymeric suspension is between 90 percent solids by weight to 99.5 percent solids by weight of the sealer system when it is in a dried state; and
  wherein said sealer system is operative to prevent release of water from the exposed concrete, brick, concrete masonry unit block, grout, plaster, gunite, tile, or aggregate when said sealer system is in the dried state in the temperature range of 90 degrees Centigrade to 140 degrees Centigrade.

27. A sealer system for sealing exposed concrete, brick, concrete masonry unit block, grout, plaster, gunite, tile, or aggregate, said sealer system comprising:
  a waterborne acrylic emulsion that has a solids content between 35 percent by weight and 45 percent by weight of the weight of the waterborne acrylic emulsion and that comprises 95 percent by weight to 98 percent by weight of the weight of the sealer system; and
  a completely or predominantly exfoliated clay that comprises between 2 percent by weight and 5 percent by weight of the weight of the solids in the waterborne acrylic emulsion;
  wherein said sealer system is operative to prevent release of water from the exposed concrete, brick, concrete masonry unit block, grout, plaster, gunite, tile, or aggregate when said sealer system is in a dried state in the temperature range of 90 degrees Centigrade to 140 degrees Centigrade.

28. A sealer system for sealing exposed concrete, brick, concrete masonry unit block, grout, plaster, gunite, tile, or aggregate, said sealer system comprising:
  an emulsion comprising a waterborne polyurethane, a waterborne alkyd, a waterborne polyester, a waterborne epoxy, a waterborne acrylic, or a combination thereof; or
  a waterborne polyolefin, a waterborne polypropylene, or a combination thereof; or
  a waterborne emulsion, a waterborne dispersion, or a waterborne suspension comprising a copolymer, wherein said waterborne emulsion, waterborne dispersion, or waterborne suspension accounts for 99 percent by weight to 95 percent by weight of the weight of the sealer system when it is dried; and
  a completely or predominantly exfoliated clay;
  wherein the percent solids of the sealer system is in the range 30 percent by weight to 60 percent by weight of the weight of the sealer system when it is undried;
  wherein said sealer system is operative to prevent release of water from the exposed concrete, brick, concrete masonry unit block, grout, plaster, gunite, tile, or aggregate when said sealer system is dried and in the temperature range of 90 degrees Centigrade to 140 degrees Centigrade.

29. A sealer system for sealing exposed concrete, brick, concrete masonry unit block, grout, plaster, gunite, tile, or aggregate, said sealer system made by combining:
  a waterborne acrylic emulsion with a solids content between 35 percent by weight and 45 percent by weight of the weight of the waterborne acrylic emulsion, wherein the emulsion accounts for 95 percent by weight to 98 percent by weight of the weight of the formulation; and
  a completely or predominantly exfoliated clay that is employed in amounts between 2 percent by weight and 5 percent by weight of the weight of the solids in the waterborne acrylic emulsion;
  wherein said sealer system is operative to prevent release of water from the exposed concrete, brick, concrete masonry unit block, grout, plaster, gunite, tile, or aggregate when said sealer system is dried and in the temperature range of 90 degrees Centigrade to 140 degrees Centigrade.

* * * * *